(12) United States Patent
Do et al.

(10) Patent No.: US 10,833,546 B2
(45) Date of Patent: Nov. 10, 2020

(54) INTERIOR PERMANENT MAGNET MOTOR

(71) Applicants: Hyundai Motor Company, Seoul (KR); Kia Motors Corporation, Seoul (KR)

(72) Inventors: Sang Hwa Do, Seongnam-si (KR); Kyoung Bum Kim, Yongin-si (KR); Yeon Ho Kim, Suwon-si (KR); Jae Bum Park, Suwon-si (KR); Hee Ra Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 210 days.

(21) Appl. No.: 16/171,738

(22) Filed: Oct. 26, 2018

(65) Prior Publication Data

US 2019/0319503 A1 Oct. 17, 2019

(30) Foreign Application Priority Data

Apr. 13, 2018 (KR) .......................... 10-2018-0043151

(51) Int. Cl.
| | | |
|---|---|---|
| *H02K 21/12* | (2006.01) | |
| *H02K 1/27* | (2006.01) | |
| *H02K 1/14* | (2006.01) | |
| *H02K 29/03* | (2006.01) | |

(52) U.S. Cl.
CPC ............. *H02K 1/276* (2013.01); *H02K 1/146* (2013.01); *H02K 29/03* (2013.01); *H02K 2213/03* (2013.01)

(58) Field of Classification Search
CPC ........ H02K 1/276; H02K 1/146; H02K 29/03; H02K 2213/03
USPC ..................................................... 310/156.56
See application file for complete search history.

(56) References Cited

U.S. PATENT DOCUMENTS 10,186,916 B2 * 1/2019 Asakura ................. H02K 1/165
2014/0062254 A1 * 3/2014 Nakatsugawa ...... H02K 1/2773
310/216.094

FOREIGN PATENT DOCUMENTS

KR 10-2013-0083209 A 7/2013

* cited by examiner

*Primary Examiner* — Jianchun Qin
(74) *Attorney, Agent, or Firm* — Morgan, Lewis & Bockius LLP

(57) ABSTRACT

An internal permanent magnet motor may include a stator of a annular shape, and a rotor coaxially disposed inside the stator by positioned between a gap between the rotor and the stator and having a plurality of permanent magnets embedded therein and spaced from each other in a circumferential direction along a circumference of the rotor, wherein the stator has a plurality of first notches formed on an internal circumferential surface facing the rotor in a height direction perpendicular to the circumferential direction thereof, and the rotor has a plurality of second notches formed on an external circumferential surface facing the stator in a height direction perpendicular to the circumferential direction thereof.

11 Claims, 7 Drawing Sheets

INTERIOR PERMANENT MAGNET MOTOR

CROSS REFERENCE TO RELATED APPLICATION

The present application claims priority to Korean Patent Application No. 10-2018-0043151 filed on Apr. 13, 2018, the entire contents of which is incorporated herein for all purposes by this reference.

BACKGROUND OF THE INVENTION

Field of the Invention

The present invention relates to an internal permanent magnet motor, and more particularly, to a technique for an internal permanent magnet motor configured for reducing a cogging torque by forming a notch in a region in which a stator and a rotor face to each other.

Description of Related Art

Generally, an internal permanent magnet motor may include a stator on which a coil is wound and formed in an annular shape, and a rotor disposed inside the stator and having a permanent magnet which is embedded therein close to the stator along an external circumferential surface thereof, and a driveshaft is axially coupled to a center portion of the rotor and is integrally interlocked and rotated with the rotor.

The internal permanent magnet motor generates a cogging torque due to a change in reluctance in a circumferential direction resulting from a magnetic field of the permanent magnet provided at the rotor, and teeth of the stator, a structure of a slot between the teeth, and the like. The cogging torque has problems of causing vibration and noise of a motor and degrading controllability.

Internal permanent magnet motors are mainly applied to eco-friendly vehicles, such as electric vehicles, hybrid electric vehicles, and fuel cell vehicles, which are driven by motors and are actively researched and developed according to recent eco-friendly issues. The internal permanent magnet motors applied to the eco-friendly vehicles increases noise, vibration, and harshness (NVS) of the eco-friendly vehicles as a cogging torque is generated, causing a problem of damaging marketability of the eco-friendly vehicles.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an internal permanent magnet motor configured for resolving problems related to noise, vibration, and harshness (NVS) of a vehicle.

According to one aspect, there is provided an internal permanent magnet motor including a stator of a annular shape, and a rotor coaxially disposed inside the stator by interposing a gap between the rotor and the stator and having a plurality of permanent magnets embedded therein and spaced from each other in a circumferential direction along a circumference of the rotor, wherein the stator has a plurality of first notches formed on an internal circumferential surface facing the rotor in a height direction perpendicular to the circumferential direction thereof, and the rotor has a plurality of second notches formed on an external circumferential surface facing the stator in a height direction perpendicular to the circumferential direction thereof.

The stator may include a ring-shaped yoke, a plurality of teeth extending inwardly from the yoke, and a plurality of shoes formed at end portions of the teeth and facing the external circumferential surface of the stator, and the plurality of first notches may be formed at the plurality of shoes.

One to three first notches may be formed at each of the plurality of shoes. Preferably, two first notches may be formed at each of the plurality of shoes.

A center of each of the plurality of first notches formed at each of the plurality of shoes in the circumferential direction and a center of each of the plurality of shoes in the circumferential direction may form an angle $A_1$ (a unit thereof is a degree) with respect to the number of slots of the stator based on a center of the stator as follows:

$$\frac{24}{S} \times 2.4 \leq A_1 \leq \frac{24}{S} \times 4.8$$

wherein S may denote the number of slots of the stator.

A width $W_1$ (a unit thereof is a millimeter (mm)) of each of the plurality of first notches formed at each of the plurality of shoes in the circumferential direction may be determined as follows:

$$\frac{24}{S} \times \frac{W_s}{16} \times 1.2 \leq W_1 \leq \frac{24}{S} \times \frac{W_s}{16} \times 3.0$$

wherein S may denote the number of slots of the stator and $W_s$ may denote a width of each of the plurality of shoes in the circumferential direction thereof.

Each of the plurality of first notches may have a depth $D_1$ in a radius direction thereof, wherein the depth $D_1$ is determined as follows:

$$\frac{R_1}{140} \times 0.2 \leq D_1 \leq \frac{R_1}{140} \times 0.5$$

wherein $R_1$ may denote a radius of the stator (a unit of the radius is a millimeter (mm)).

A cross section perpendicular to the height direction of each of the plurality of first notches may be a rectangular shape or a trapezoid having a width which is widened toward a central direction thereof.

One to three second notches may be formed at an external surface of a core of the rotor, which corresponds to a region in which each of the plurality of permanent magnets is embedded in the rotor. Preferably, two second notches may be formed at an external surface of a core of the rotor, which corresponds to a region in which each of the plurality of permanent magnets is embedded in the rotor.

A center of each of the two second notches in the circumferential direction and a center of the circumferential direction in a region, in which one polarity permanent magnet closest to each of the two second notches among the plurality of permanent magnets is embedded, may form an angle $A_2$ based on a center of the rotor as follows:

$$\frac{16}{P} \times 2.8 \leq A_2 \leq \frac{16}{P} \times 4.8$$

wherein P may denote the number of poles of the rotor.

A width $W_2$ (a unit thereof is a millimeter (mm)) of each of the plurality of second notches in the circumferential direction may be determined as follows:

$$\frac{16}{P} \times \frac{R}{100} \times 1.0 \leq W_2 \leq \frac{16}{P} \times \frac{R}{100} \times 5.0$$

wherein P may denote the number of poles of the rotor and R may denote a radius of the rotor.

Each of the plurality of second notches may have a depth $D_2$ in a radius direction thereof, wherein the depth $D_2$ is determined as follows:

$$\frac{R_2}{100} \times 0.2 \leq D_2 \leq \frac{R_2}{100} \times 0.5,$$

wherein $R_2$ may denote a radius of the rotor (a unit thereof is a millimeter (mm)).

A cross section perpendicular to the height direction of each of the plurality of second notches may be a rectangular shape or a trapezoid having a width which is widened toward a circumferential direction thereof.

In accordance with the internal permanent magnet motor, a cogging torque may be significantly reduced through optimization of a notch structure to prevent degradation in controllability of a vehicle, and in the case of a motor sensitive to an initial driving, motor control may be facilitated due to a reduction in cogging torque.

Furthermore, in accordance with the internal permanent magnet motor, the cogging torque may be reduced to prevent an increase of vibration in a frequency band of the cogging torque, such that noise may be reduced and thus performance relating to noise, vibration, and harshness (NVH) may be significantly improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
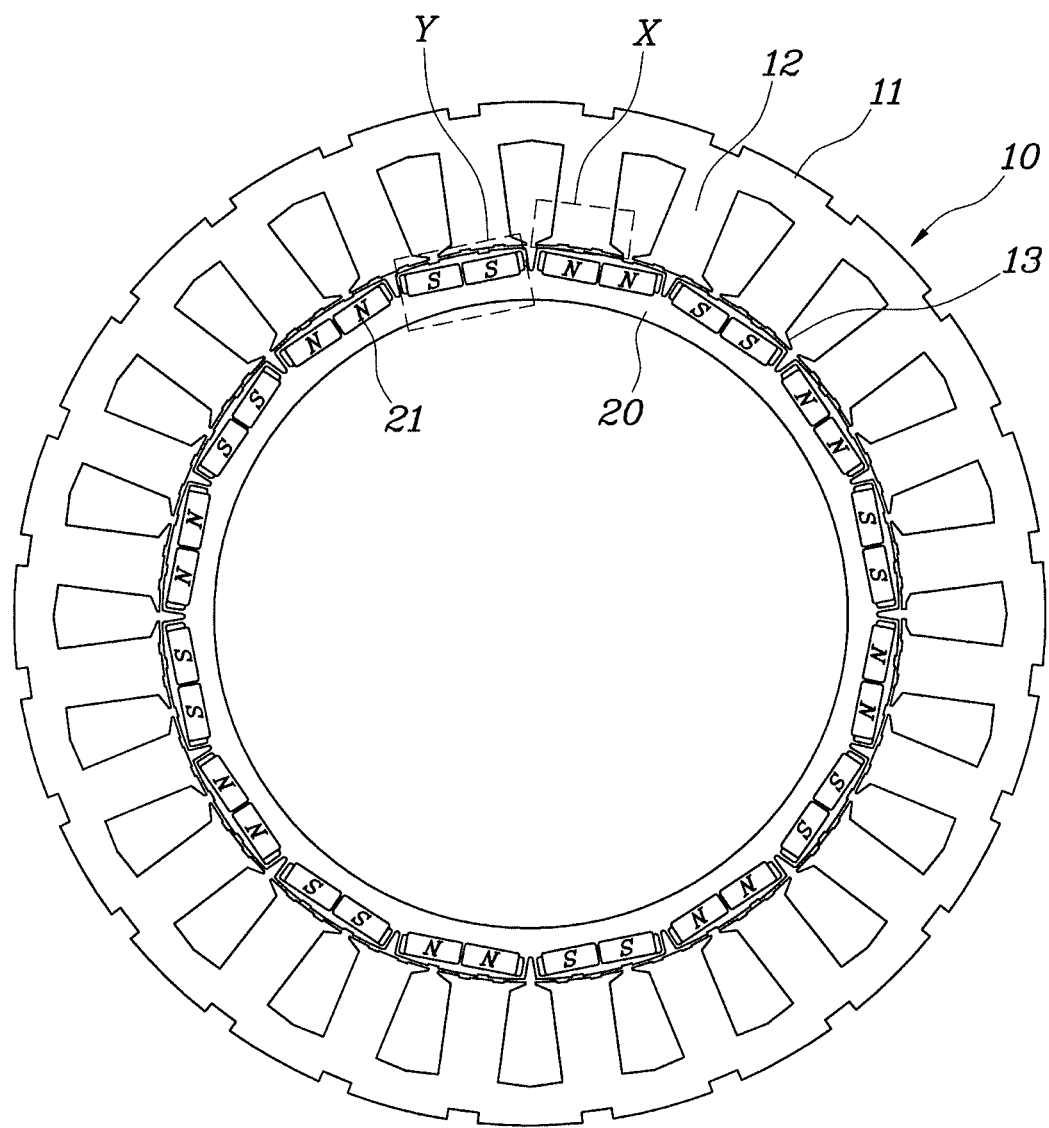
FIG. 1 is a plan view of an internal permanent magnet motor according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an internal permanent magnet motor will be described in more detail with reference to the accompanying drawings.

Figure 2:
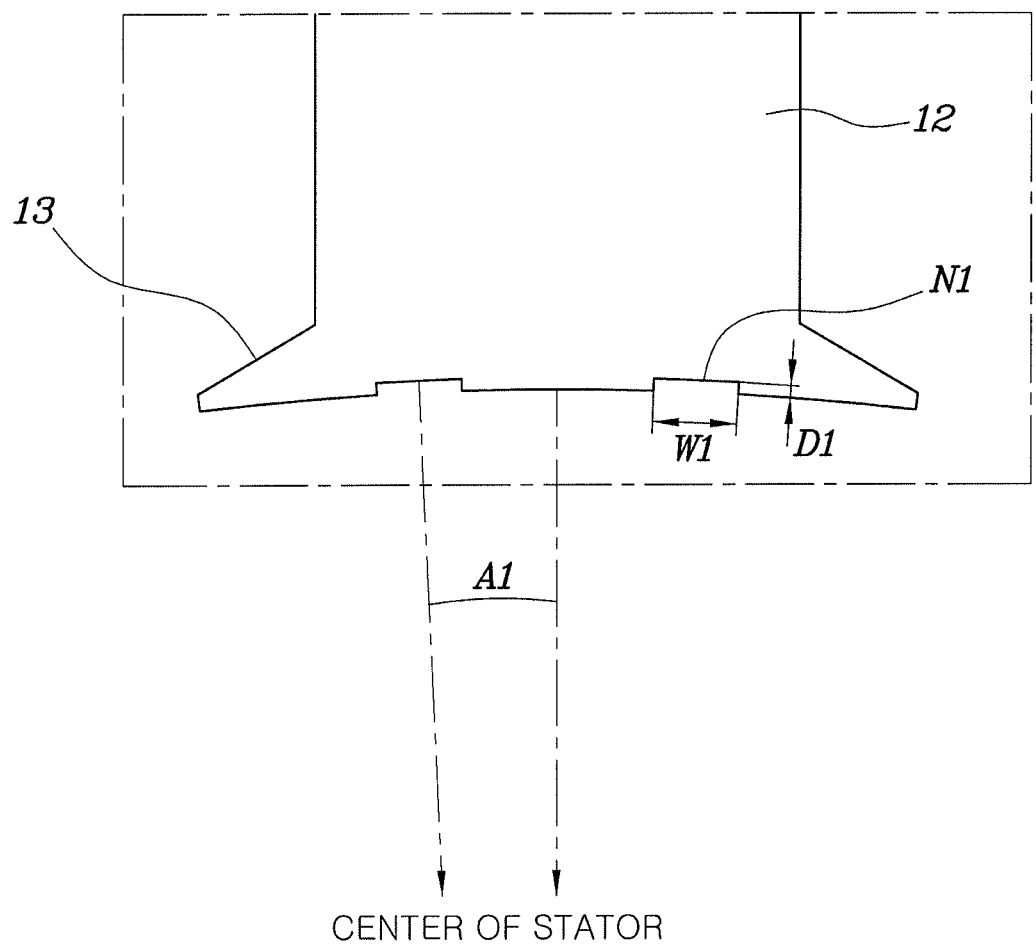
FIG. 2 is an enlarged view of a main portion of a stator of the internal permanent magnet motor shown in FIG. 1.
Figure 3:
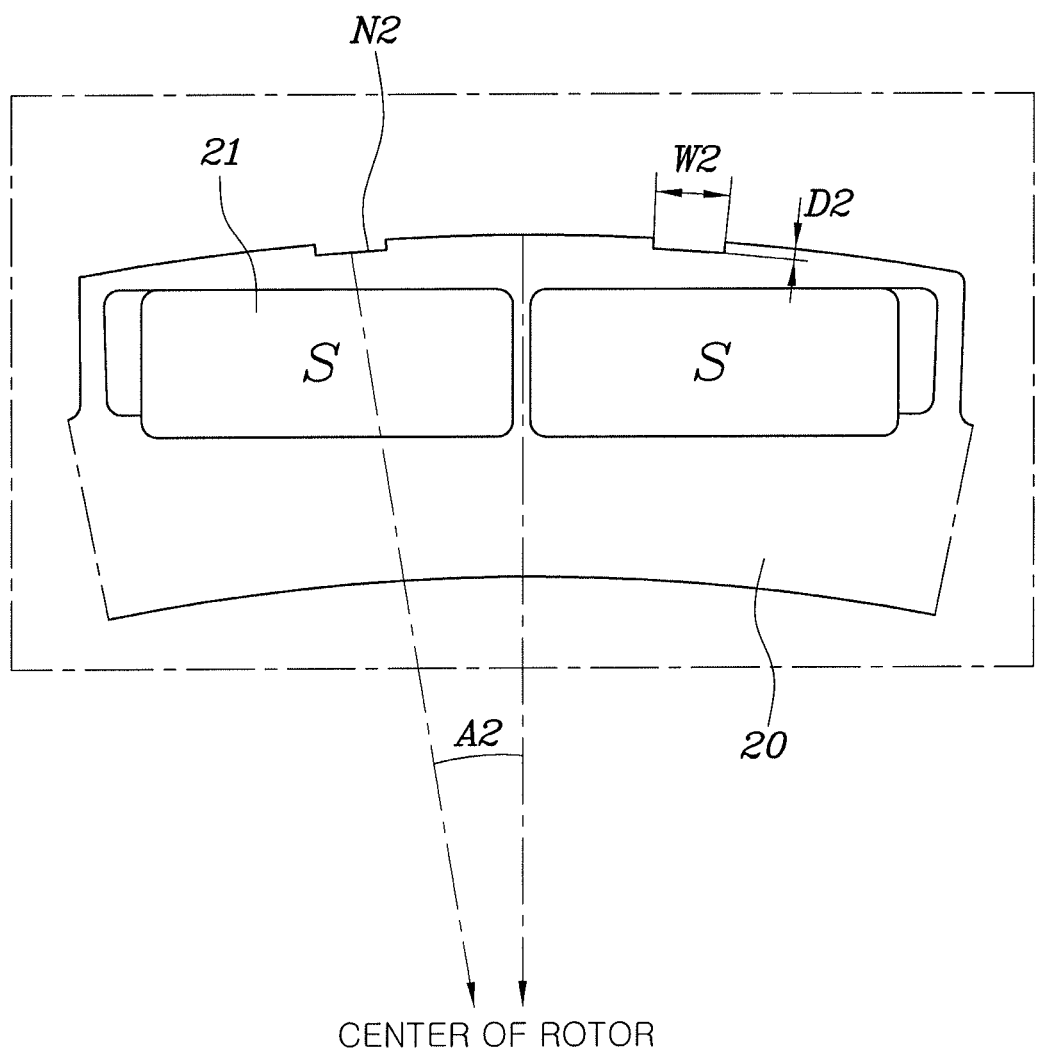
FIG. 3 is an enlarged view of a main portion of a rotor of the internal permanent magnet motor shown in FIG. 1.

FIG. 1 is a plan view of an internal permanent magnet motor according to an exemplary embodiment of the present invention, FIG. 2 is an enlarged view of a main portion X of a stator of the internal permanent magnet motor shown in FIG. 1, and FIG. 3 is an enlarged view of a main portion Y of a rotor of the internal permanent magnet motor shown in FIG. 1.

Referring to FIG. 1, FIG. 2, and FIG. 3, the internal permanent magnet motor according to an exemplary embodiment of the present invention includes a ring-shaped stator 10, and a rotor 20 coaxially disposed inside the stator 10 with a space therebetween and having a plurality of permanent magnets 21 which are embedded therein and spaced from each other along an external side of the rotor 20 in a circumferential direction thereof.

In an exemplary embodiment of the present invention, a plurality of notches N1 and N2 are provided on surfaces facing each other of the stator 10 and the rotor 20. The plurality of notches N1 and N2 may be formed along a height direction perpendicular to the circumferential direction of the stator 10 or the rotor 20, a cross section of each of the plurality of notches N1 and N2 may have a predetermined shape (a rectangular shape or a trapezoid shape having a width increasing or decreasing).

The stator 10 may include a yoke 11, a plurality of teeth 12 extending inwardly from the yoke 11, and a shoe 13 formed at an end portion of each of the plurality of teeth 11 and facing the rotor 20. In such a motor structure, the notches N1 may be formed on a surface of the shoe 13 facing the rotor 20.

A reduction characteristic in cogging torque of the motor is varied by a factor such as the stator 10, and specifically, the number of the first notch N1 formed at each of the shoes 13, a width W1 of the first notch N1 and an interval A1 between the first notches N1 when a plurality of first notches N1 are formed, and a depth D1 of the first notch N1.

Similarly, the reduction characteristic in cogging torque of the motor is varied by a factor such as the number of the second notch N2 formed at the rotor 20, a width $W_2$ of the second notch N2, a depth $D_2$ thereof, and an angle $A_2$ between the second notches N2. In the case of the rotor 20, it is possible to change the reduction characteristic in cogging torque by forming the same number of the second notch N2 in a region adjacent to each of polarities of permanent magnets 21 provided as the rotor 20.

Hereinafter, various experimental examples from which a characteristic of the internal permanent magnet motor according to various embodiments of the present invention may be seen will be described.

As described above, the internal permanent magnet motor according to various embodiments of the present invention may reduce a cogging torque of the motor by forming a notch on each of facing surfaces of a stator and a rotor in a height direction perpendicular to a circumferential direction thereof.

The cogging torque is one of main factors causing degradation of NVH when a vehicle is slowly accelerated or decelerated, and a characteristic of the cogging torque may be varied according to a shape of a boundary portion between the stator and the rotor. The cogging torque may mechanically have a cycle corresponding to a least common multiple of the number of poles and slots of the motor.

The following experimental examples are on the basis of a motor having 16 poles 24 slots. A cogging torque of the motor used in the present experiment is generated with a cycle of 48 which is a least common multiple of 16 and 24, and since an order mainly affecting on NVH of a vehicle is a 48th order and a 96th order which is a multiple of the 48th order, a measured result of the sum of 48th order and 96th order cogging torques is used.

Experimental Example 1

Figure 4:
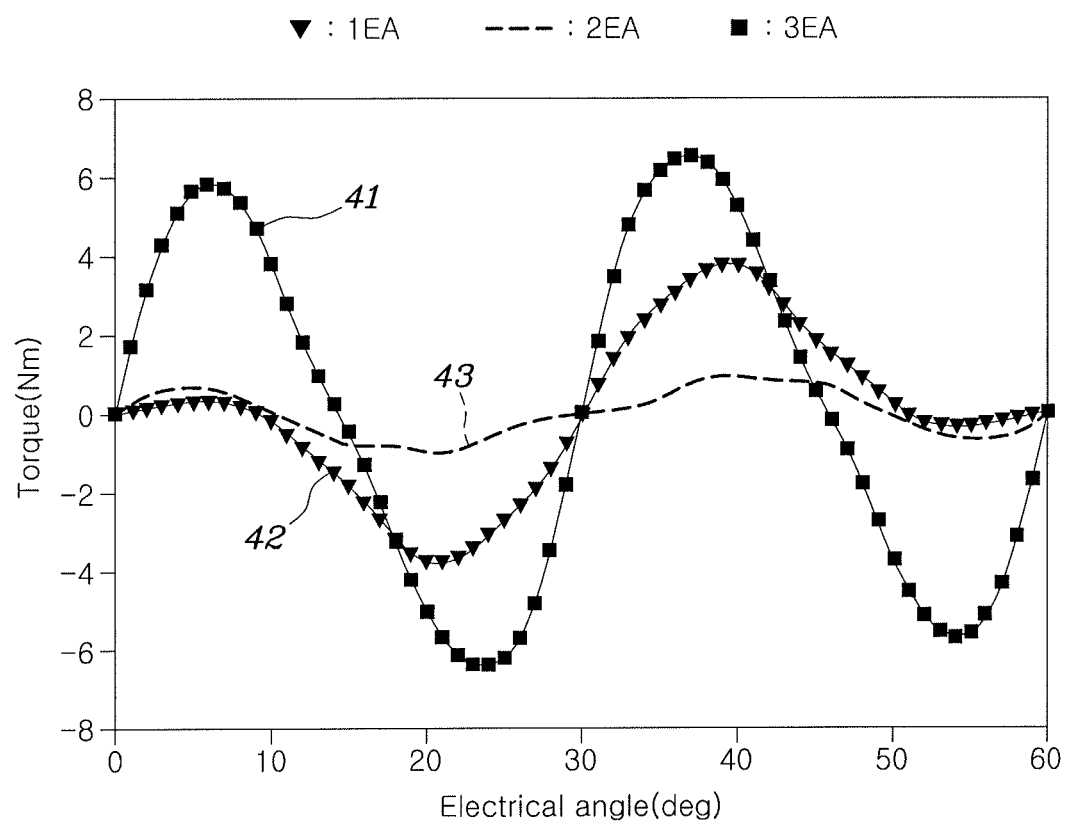
FIG. 4 is a graph showing changes in cogging torque according to the number of notches formed at a stator and a rotor in an internal permanent magnet motor according to various embodiments of the present invention.

FIG. 4 is a graph showing changes in cogging torque according to the number of notches formed at a stator and a rotor in the internal permanent magnet motor according to various embodiments of the present invention.

As shown in FIG. 2, in the case of the stator 10, an experiment was performed such that one to three first notches N1 having the same width were formed on a surface of the shoe 13 facing the rotor 20. Furthermore, as shown in FIG. 3, in the case of the rotor 20, the experiment was performed such that a plurality of second notches N2 are formed on an external circumferential surface, and particularly, one to three second notches N2 are formed per one polarity permanent magnet 21.

As shown in FIG. 4, a lowest cogging torque was generated when two first notches N1 were formed per shoe 13 of the stator 10 and two second notches N2 were formed per one polarity permanent magnet 21 of the rotor 20. In FIG. 4, a reference numeral "41" denotes a cogging torque when three notches were formed, a reference numeral "42" denotes a cogging torque when one notch was formed, and a reference numeral "43" denotes a cogging torque when two notches were formed.

Through such an experiment, it was determined that a reduction in cogging torque may be achieved by forming the notches N1 and N2 on the stator 10 and rotor 20, and preferably, it was determined that an excellent effect for the reduction in cogging torque was obtained when two first notches N1 were formed per shoe 13 of the stator 10 and two second notches N2 were formed per one polarity permanent magnet 21 of the rotor 20.

Experimental Example 2

On the basis of the results of Experimental Example 1, the number of notches formed at each of the stator 10 and the rotor 20 was fixed to two, and changes of a primary cogging torque and a secondary cogging torque were measured by changing positions of the notches formed at each of the stator 10 and the rotor 20.

That is, a width $W_1$ of each of the two first notches N1 formed at the stator 10 and a width $W_2$ of each of the two second notch N2 formed per one polarity permanent magnet 21 of the rotor 20 were fixed. Furthermore, changes of the primary cogging torque and the secondary cogging torque were measured by varying an angle $A_1$ (based on a center of the stator 10) formed by a center of the shoe 13 in a circumferential direction and a center of a single first notch N1, and an angle $A_2$ (based on a center of the rotor 20) formed by a center of one polarity permanent magnet 21 in the circumferential direction and a center of a single second notch N2 closest to the one polarity permanent magnet 21.

The changes of the primary cogging torque and the secondary cogging torque measured in Experimental Example 2 were shown in the following Tables 1 and 2.

TABLE 1

| | | Cogging Torque [First order, Nm] | | | | | | | | |
|---|---|---|---|---|---|---|---|---|---|---|
| | | Stator Notch Angle [deg.] | | | | | | | | |
| | | 2 | 2.4 | 2.8 | 3.2 | 3.6 | 4 | 4.4 | 4.8 | 5.2 |
| Rotor Notch Angle [deg.] | 2 | 2.92 | 2.06 | 1.31 | 0.77 | 0.47 | 0.45 | 0.99 | 1.92 | 2.99 |
| | 2.4 | 3.68 | 2.50 | 1.47 | 0.77 | 0.43 | 0.50 | 1.31 | 2.55 | 3.89 |
| | 2.8 | 4.32 | 2.88 | 1.62 | 0.74 | 0.40 | 0.57 | 1.58 | 3.09 | 4.66 |
| | 3.2 | 4.77 | 3.15 | 1.73 | 0.75 | 0.40 | 0.63 | 1.80 | 3.49 | 5.23 |
| | 3.6 | 5.01 | 3.30 | 1.79 | 0.77 | 0.42 | 0.74 | 1.92 | 3.71 | 5.52 |
| | 4 | 4.95 | 3.27 | 1.79 | 0.80 | 0.45 | 0.72 | 1.93 | 3.69 | 5.48 |
| | 4.4 | 4.64 | 3.08 | 1.74 | 0.82 | 0.50 | 0.80 | 1.86 | 3.48 | 5.13 |
| | 4.8 | 4.08 | 2.75 | 1.61 | 0.84 | 0.55 | 0.73 | 1.66 | 3.05 | 4.49 |
| | 5.2 | 3.33 | 2.29 | 1.42 | 0.82 | 0.57 | 0.66 | 1.37 | 2.46 | 3.64 |

TABLE 2

Cogging Torque [Second order, Nm]

| | | Stator Notch Angle [deg.] | | | | | | | | |
|---|---|---|---|---|---|---|---|---|---|---|
| | | 2 | 2.4 | 2.8 | 3.2 | 3.6 | 4 | 4.4 | 4.8 | 5.2 |
| Rotor Notch Angle [deg.] | 2 | 0.55 | 0.82 | 3.31 | 5.72 | 6.79 | 6.15 | 3.77 | 1.28 | 0.26 |
| | 2.4 | 0.33 | 0.79 | 2.85 | 4.86 | 5.77 | 5.24 | 3.24 | 1.13 | 0.19 |
| | 2.8 | 0.09 | 0.75 | 2.01 | 3.26 | 3.85 | 3.54 | 2.24 | 0.88 | 0.02 |
| | 3.2 | 0.51 | 0.72 | 1.15 | 1.65 | 1.91 | 1.80 | 1.25 | 0.65 | 0.28 |
| | 3.6 | 0.75 | 0.68 | 0.65 | 0.70 | 0.78 | 0.74 | 0.68 | 0.55 | 0.47 |
| | 4 | 0.69 | 0.66 | 0.71 | 0.85 | 0.98 | 0.99 | 0.81 | 0.61 | 0.49 |
| | 4.4 | 0.35 | 0.65 | 1.30 | 2.01 | 2.40 | 2.22 | 1.58 | 0.81 | 0.33 |
| | 4.8 | 0.08 | 0.66 | 2.13 | 3.61 | 4.35 | 4.04 | 2.61 | 1.05 | 0.06 |
| | 5.2 | 0.43 | 0.70 | 2.81 | 4.88 | 5.90 | 5.44 | 3.42 | 1.23 | 0.16 |

As shown in Tables 1 and 2, the primary cogging torque and the secondary cogging torque were changed according to the positions of the two first notches N1 (an angle therebetween) formed at each of the shoes 13 of the stator 10 and the positions of the two second notches N2 (an angle therebetween) formed per each of the permanent magnets 21 of the rotor 20. In consideration of variations in magnitude of the first cogging torque and the second cogging torque shown in Tables 1 and 2, it is determined that the angle $A_1$ formed by the center of the single first notch N1 and the center of the shoe 13 in the circumferential direction is preferably in the range of approximately 2.4 degrees to 4.8 degrees, and the angle $A_2$ formed by the center of the one polarity permanent magnet 21 in the circumferential direction and the center of the single second notch N2 closest to the one polarity permanent magnet 21 is preferably in the range of approximately 2.4 degrees to 4.8 degrees.

Experimental Example 3

On the basis of the results of Experimental Example 1, a change in cogging torque was measured by fixing the number of notches, a width of each of the notches, and a position of each of notches of the rotor 20 and varying a width $W_1$ of each of the two first notches N1 formed at the stator 10 and the angle $A_1$ (based on the center of the stator 10) formed by the center of the shoe 13 in the circumferential direction and the center of the single first notch N1.

The results of Experimental Example 3 are shown in the following Table 3.

center of the single first notch N1 was in the range of 2.4 degrees to 4.8 degrees, a preferable value of the cogging torque may be obtained. Furthermore, when the width $W_1$ of the first notch N1 was in the range of 1.2 mm to 3.0 mm, a preferable value of the cogging torque of less than 4 Nm may be obtained.

The preferable cogging torque may not be achieved in the relationship between the width $W_1$ of each of the two first notches N1 formed at the stator 10 and the angle $A_1$ formed by the center of the shoe 13 in the circumferential direction and the center of the single first notch N1, but when one of the above-described two conditions, the other condition may be appropriately adjusted to obtain the preferable cogging torque, so that all the above-described ranges may be set to obtain the preferable cogging torque.

Therefore, when the two first notches N1 are formed at the shoe 13 of the stator 10, the angle $A_1$ formed by the center of the shoe 13 in the circumferential direction and the center of the single first notch N1, and the width $W_1$ of the first notch N1 may be determined.

$$\frac{24}{S} \times 2.4 \leq A_1 \leq \frac{24}{S} \times 4.8 \quad \text{[Equation 1]}$$

$$\frac{24}{S} \times \frac{W_s}{16} \times 1.2 \leq W_1 \leq \frac{24}{S} \times \frac{W_s}{16} \times 3.0 \quad \text{[Equation 2]}$$

Here, S denotes the number of slots of the stator 10, and $W_s$ denotes a width of the shoe 13 in the circumferential direction thereof.

TABLE 3

Cogging Torque [First order + Second order, Nm]

| | | Stator Notch Angle [deg.] | | | | | | | | |
|---|---|---|---|---|---|---|---|---|---|---|
| | | 2 | 2.4 | 2.8 | 3.2 | 3.6 | 4 | 4.4 | 4.8 | 5.2 |
| Stator Notch Width [mm] | 1 | 5.85 | 5.24 | 4.64 | 4.20 | 4.10 | 4.38 | 4.94 | 5.63 | 6.57 |
| | 1.2 | 5.85 | 5.07 | 4.34 | 3.79 | 3.68 | 3.98 | 4.61 | 5.47 | 6.54 |
| | 1.4 | 5.85 | 4.91 | 4.04 | 3.40 | 3.26 | 3.58 | 4.29 | 5.27 | 6.50 |
| | 1.6 | 5.84 | 4.74 | 3.72 | 2.99 | 2.84 | 3.19 | 3.95 | 5.07 | 6.44 |
| | 1.8 | 5.83 | 4.57 | 3.41 | 2.61 | 2.42 | 2.80 | 3.62 | 4.88 | 6.36 |
| | 2 | 5.82 | 4.40 | 3.10 | 2.23 | 2.01 | 2.39 | 3.29 | 4.68 | 6.26 |
| | 2.2 | 5.80 | 4.19 | 2.79 | 1.85 | 1.61 | 2.01 | 2.96 | 4.49 | 6.15 |
| | 2.4 | 5.77 | 4.06 | 2.55 | 1.57 | 1.21 | 1.61 | 2.68 | 4.35 | 6.05 |
| | 2.6 | 5.75 | 3.89 | 2.27 | 1.25 | 0.95 | 1.40 | 2.42 | 4.17 | 5.93 |
| | 2.8 | 5.73 | 3.66 | 2.01 | 0.95 | 0.86 | 1.00 | 2.16 | 4.02 | 5.76 |
| | 3 | 5.69 | 3.54 | 1.74 | 0.82 | 1.27 | 0.80 | 1.89 | 3.84 | 5.56 |

As shown in Table 3, when the angle $A_1$ formed by the center of the shoe 13 in the circumferential direction and the As described above, in consideration that the experimental examples of the present invention are on the basis of a motor of 16 poles and 24 slots, since an almost linearly similar characteristic may be obtained even when the number of poles and slots are varied, a scaling factor was applied to a boundary value.

Experimental Example 4

As in Experimental Example 3, on the basis of the results of Experimental Example 1, a change in cogging torque was measured by fixing the number of notches of the stator 10, widths thereof, and positions thereof and varying the width $W_2$ of each of the two second notches N2 formed per one polarity permanent magnet 21 of the rotor 20 and the angle $A_2$ (based on the center of the rotor 20) formed by the center of the one polarity permanent magnet 21 in the circumferential direction and the center of the single second notch N2 closest to the one polarity permanent magnet 21.

The results of Experimental Example 4 are shown in the following Table 4.

TABLE 4

| | | Cogging Torque [First order + Second order, Nm] | | | | | | | | |
|---|---|---|---|---|---|---|---|---|---|---|
| | | Rotor Notch Angle [deg.] | | | | | | | | |
| | | 2 | 2.4 | 2.8 | 3.2 | 3.6 | 4 | 4.4 | 4.8 | 5.2 |
| Rotor Notch Width [mm] | 1 | 4.89 | 4.42 | 3.71 | 3.04 | 2.66 | 2.72 | 3.16 | 3.77 | 4.90 |
| | 1.4 | 5.45 | 4.80 | 3.75 | 2.75 | 2.17 | 2.27 | 2.97 | 3.90 | 5.45 |
| | 1.8 | 5.97 | 5.16 | 3.81 | 2.45 | 1.71 | 1.86 | 2.80 | 4.13 | 5.94 |
| | 2.2 | 6.45 | 5.51 | 3.87 | 2.23 | 1.32 | 1.49 | 2.66 | 4.30 | 6.44 |
| | 2.6 | 6.84 | 5.78 | 3.91 | 2.04 | 0.99 | 1.19 | 2.49 | 4.47 | 6.78 |
| | 3 | 7.10 | 5.97 | 3.96 | 1.95 | 0.81 | 0.99 | 2.46 | 4.53 | 7.00 |
| | 3.4 | 7.29 | 6.12 | 3.99 | 1.85 | 0.67 | 0.92 | 2.44 | 4.61 | 7.17 |
| | 3.8 | 7.39 | 6.21 | 4.08 | 1.87 | 0.66 | 0.91 | 2.47 | 4.68 | 7.00 |
| | 4.2 | 7.35 | 6.21 | 4.14 | 1.97 | 0.78 | 1.02 | 2.56 | 4.78 | 6.94 |
| | 4.6 | 7.23 | 6.15 | 4.19 | 2.14 | 1.01 | 1.21 | 2.69 | 4.78 | 6.70 |
| | 5 | 6.99 | 6.01 | 4.23 | 2.43 | 1.34 | 1.52 | 2.85 | 4.75 | 6.34 |

As shown in Table 4, when the angle $A_2$ formed by the center of the one polarity permanent magnet 21 in the circumferential direction and the center of the single second notch N2 closest to the one polarity permanent magnet 21 was in the range of 2.8 degrees to 4.8 degrees, a preferable value of the cogging torque may be obtained. Furthermore, when the width $W_2$ of the second notch N2 was in the range of 1.0 mm to 5.0 mm, a preferable value of the cogging torque of less than 4 Nm may be obtained.

When applying and summarizing the same criteria applied to Experimental Example 3 and two first notches N1 are formed at the shoe 13 of the rotor 20, the angle $A_2$ formed by the center of the one polarity permanent magnet 21 in the circumferential direction and the center of the single second notch N2 closest to the one polarity permanent magnet 21 may be determined as the following Equations 3 and 4.

$$\frac{16}{P} \times 2.8 \leq A_2 \leq \frac{16}{P} \times 4.8 \quad \text{[Equation 3]}$$

$$\frac{16}{P} \times \frac{R}{100} \times 1.0 \leq W_2 \leq \frac{16}{P} \times \frac{R}{100} \times 5.0 \quad \text{[Equation 4]}$$

Here, P denotes the number of poles of the rotor 20 and R denotes a radius of the rotor 20.

Experimental Example 5

Figure 5:
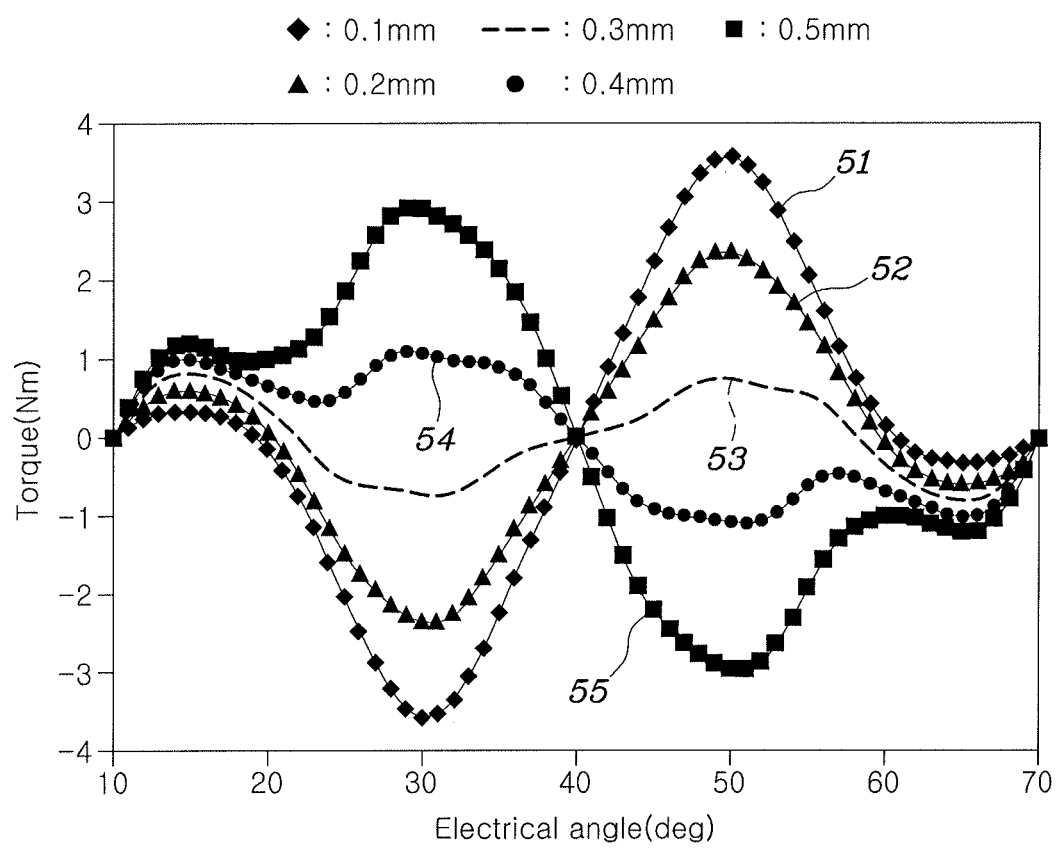
FIG. 5 and FIG. 6 are graphs showing the results of determining a cogging torque by varying depths of notches and cross sections of the stator and the rotor of the internal permanent magnet motor according to various embodiments of the present invention.
Figure 6:
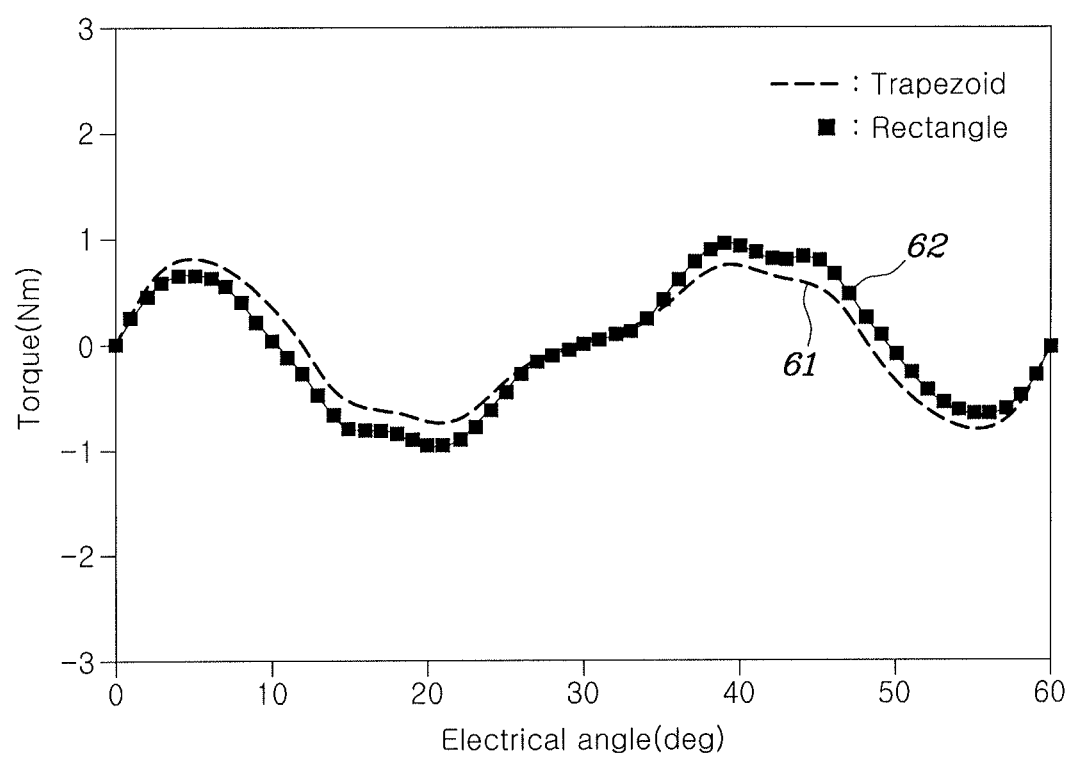

FIG. 5 and FIG. 6 are graphs showing the results of determining a cogging torque by varying depths of notches and cross sections of the stator and the rotor of the internal permanent magnet motor according to various embodiments of the present invention.

As shown in FIG. 5, when a depth of each of the first and second notches N1 and N2 in a radius direction is varied, a lowest cogging torque was shown at the depths of approximately 0.3 mm and 0.4 mm (53 and 54 of FIG. 5, respectively). In Experiment Example 5, since an absolute magnitude of the cogging torque is a value which may be varied according to the number of the notches or the positions thereof, it is preferable to consider a relative cogging torque per depth of the first and second notches N1 and N2. In consideration that, when a depth of each of the first and second notches N1 and N2 is 0.3 mm and 0.4 mm (53 and 54 of FIG. 5), cogging torques have values smaller than two times or more cogging torques when depths are 0.1, 0.4, and 0.5 mm (51, 52, and 55 of FIG. 5), the depth of each of the first notch N1 and the second notch N2 exceeds 0.2 mm and is less than 0.5 mm.

In consideration that the notches may be linearly changed according to a radius of the rotor 20 even when the radii of the stator 10 and the rotor 20 of the motor used in Experimental Example 5 are respectively 140 mm and 100 mm and are varied, the depth of the first notch N1 and the depth of the second notch N2 may be determined as the following Equations 5 and 6.

$$\frac{R_1}{140} \times 0.2 \leq D_1 \leq \frac{R_1}{140} \times 0.5 \quad \text{[Equation 5]}$$

$$\frac{R_2}{100} \times 0.2 \leq D_2 \leq \frac{R_2}{100} \times 0.5 \quad \text{[Equation 6]}$$

Furthermore, as shown in FIG. 6, when the result of the cogging torque according to the cross-sectional shapes of the first and second notches N1 and N2 (a cross section perpendicular to the height direction) was determined, a slightly superior reduction in cogging torque was shown when the first notch N1 is a trapezoid shape having a width which is widened in a central direction (an direction of an internal circumferential surface) or the second notch N2 is a trapezoid shape having a width which is widened in a circumferential direction (a direction of an external circumferential surface) compared with a rectangular shape of the cross-sectional shape (61 of FIG. 6). Therefore, it is determined that both the rectangular shape and the trapezoidal shape are applicable to the cross-sectional shape of the notch.

Experimental Example 6

Sixth, cogging torques were measured in cases in which the notch is not formed at both the stator 10 and the rotor 20 of the internal permanent magnet motor, the notch is formed at only one of the stator 10 and the rotor 20 thereof, and the notch is formed at both the stator 10 and the rotor 20. The measured results are shown in the following Table 5.

TABLE 5

|  | 48th Order Cogging Torque (Nm) | 96th Order Cogging Torque (Nm) |
|---|---|---|
| No Formation of Notch | 2.5 | 1.6 |
| Formation of Notch at Stator only | 0.2 | 3.7 |
| Formation of Notch at Rotor only | 5.1 | 0.5 |
| Formation of Notch at both Stator and Rotor | 0.2 | 0.7 |

As shown in Table 5, it may be seen that, when the notch is not formed or only the rotor 20 or the stator 10 is formed, it is difficult to expect a reduction effect of the cogging torque in all orders, but when notches are formed at both the rotor 20 and the stator 10, the cogging torque is significantly reduced.

Experimental Example 7

Seventh, cogging torques were measured at each of orders thereof when arrangement angles of the permanent magnets 21 disposed at the rotor 20 of the internal permanent magnet motor were changed and notches were formed and were not formed at the stator 10 and rotor 20. As shown in FIG. 3, the previous experiments were conducted such that two permanent magnets 21 having one polarity were disposed in parallel to each other (an angle between the two permanent magnets 21 was 180 degrees). In Experimental Example 7, to determine influence of an installation angle of the permanent magnet 21 embedded in the rotor 20 on a cogging torque, the cogging torque was measured after permanent magnets 21 having one polarity were disposed at an angle of 150 degrees in the external circumferential direction thereof. The measured results are shown in the following Table 6.

TABLE 6

|  | 48th Order Cogging Torque (Nm) | 96th Order Cogging Torque (Nm) |
|---|---|---|
| No Formation of Notch | 2.3 | 1.9 |
| Formation of Notch | 0.1 | 1.1 |

As shown in Table 6, even when the arrangement angle of the permanent magnets 21 is changed, it may be determined that the cogging torque is significantly reduced when the notches are formed at the stator 10 and the rotor 20 of the internal permanent magnet motor.

Figure 7:
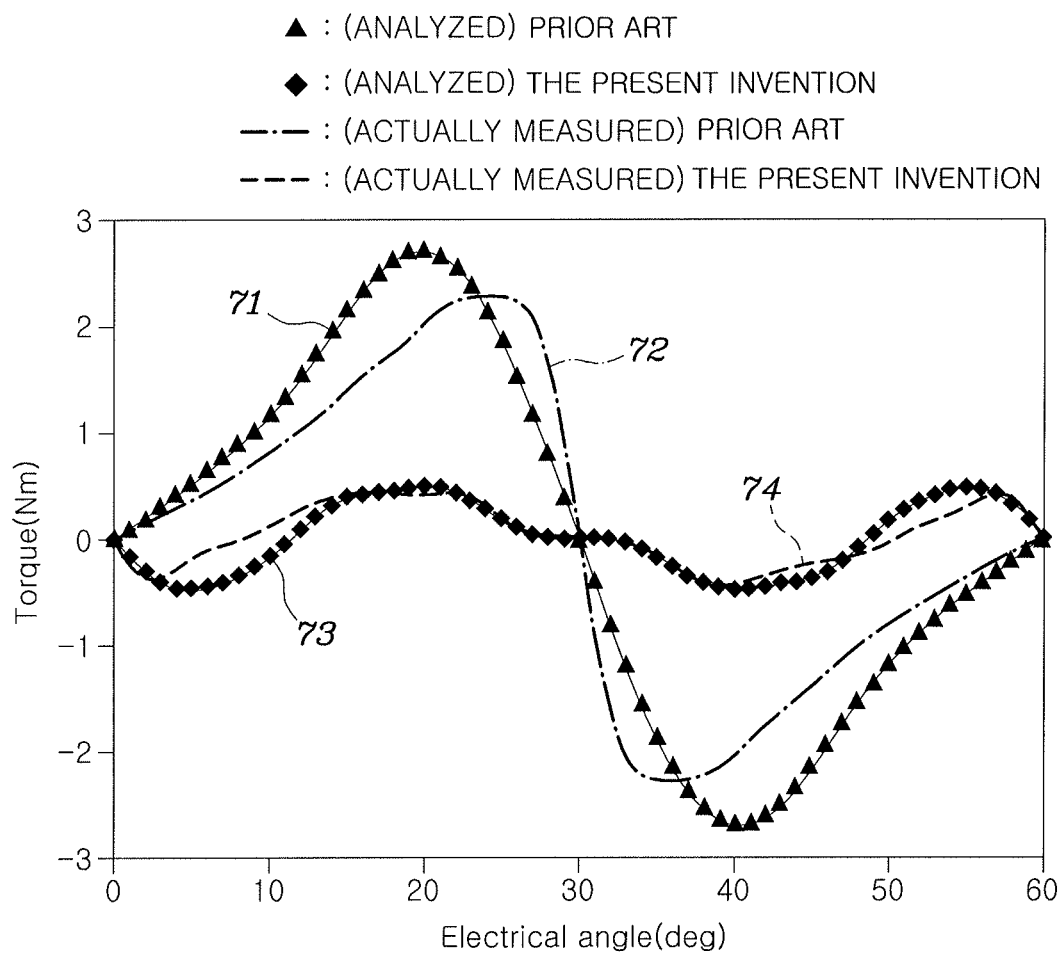
FIG. 7 is a graph showing performance of the internal permanent magnet motor according to an exemplary embodiment of the present invention and performance of a permanent magnet motor having no notch structure and standards the same as those of the internal permanent magnet motor.

Finally, FIG. 7 illustrates a graph showing performance of the internal permanent magnet motor according to an exemplary embodiment of the present invention in which the cogging torque is reduced through the above-described optimization of the notch structure and performance of a permanent magnet motor having no notch structure and standards the same as those of the internal permanent magnet motor.

As shown in FIG. 7, when comparing a cogging torque 71 of a conventional motor derived from a motor design analysis with an actually measured cogging torque 72 of the conventional motor, it may be determined that both an analyzed cogging torque 73 and an actually measured cogging torque 74 of the internal permanent magnet motor according to an exemplary embodiment of the present invention are significantly reduced. According to the graph shown in FIG. 7, it may be determined that the analyzed cogging torque 73 of the internal permanent magnet motor according to an exemplary embodiment of the present invention is reduced to about 80% of the analyzed cogging torque 71 of the conventional motor.

As described above, the internal permanent magnet motor according to various embodiments of the present invention can significantly reduce a cogging torque through optimization of a notch structure to prevent degradation in controllability of a vehicle, and in the case of a motor sensitive to an initial driving, motor control may be facilitated due to a reduction in cogging torque.

Furthermore, the internal permanent magnet motor according to various embodiments of the present invention can reduce the cogging torque to prevent an increase of vibration in a frequency band of the cogging torque, reducing noise to significantly improve performance relating to NVH.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An internal permanent magnet motor, comprising:
    a stator of an annular shape; and
    a rotor coaxially disposed inside the stator with a gap between the rotor and the stator, wherein a plurality of permanent magnets is embedded in the rotor and spaced from each other in a circumferential direction of the rotor along a circumference of the rotor,
    wherein the stator has at least a first notch formed on an internal circumferential surface facing the rotor in a direction perpendicular to a circumferential direction of the stator,
    wherein the rotor has a least a second notch formed on an external circumferential surface of the rotor facing the internal circumferential surface of the stator in a direction perpendicular to a circumferential direction of the rotor, wherein the at least a first notch includes two first notches formed at each of the plurality of shoes with a predetermined interval, and wherein a center of each of the two first notches formed at each of the plurality of shoes in the circumferential direction of the stator and a center of each of the plurality of shoes in the circumferential direction of the stator form an angle $A_1$ with respect to a number of slots of the stator based on a center of the stator as follows:

$$\frac{24}{S} \times 2.4 \leq A_1 \leq \frac{24}{S} \times 4.8,$$

wherein S denotes the number of slots of the stator.

2. The motor of claim 1, wherein the stator includes a yoke, a plurality of teeth extending inwardly from the yoke, and a plurality of shoes formed at end portions of the teeth and facing the external circumferential surface of the rotor, and wherein the at least a first notch is formed at each of the plurality of shoes.

3. The motor of claim 2, wherein a width $W_1$ of each of the two first notches formed at each of the plurality of shoes in the circumferential direction of the stator is determined as follows:

$$\frac{24}{S} \times \frac{W_s}{16} \times 1.2 \leq W_1 \leq \frac{24}{S} \times \frac{W_s}{16} \times 3.0,$$

wherein S denotes a number of slots of the stator and $W_s$ denotes a width of each of the plurality of shoes in the circumferential direction of the stator.

4. The motor of claim 1, wherein each of the at least a first notch has a depth $D_1$ in a radius direction of the stator, wherein the depth $D_1$ is determined as follows:

$$\frac{R_1}{140} \times 0.2 \leq D_1 \leq \frac{R_1}{140} \times 0.5,$$

wherein $R_1$ denotes a radius of the stator.

5. The motor of claim 1, wherein a cross section perpendicular to a height direction of each of the at least a first notch is a rectangular shape or a trapezoid having a width which is widened toward a central direction thereof.

6. The motor of claim 1, wherein the at least a second notch includes one to three second notches formed at an external surface of a core of the rotor, which corresponds to a region in which each of the plurality of permanent magnets is embedded in the rotor.

7. The motor of claim 1, wherein the at least a second notch includes two second notches formed at an external surface of a core of the rotor, which corresponds to a region in which each of the plurality of permanent magnets is embedded in the rotor.

8. The motor of claim 7, wherein a center of each of the two second notches in the circumferential direction and a center of the circumferential direction of the rotor in a region, in which a polarity permanent magnet closest to each of the two second notches among the plurality of permanent magnets is embedded, form an angle A2 based on a center of the rotor as follows:

$$\frac{16}{P} \times 2.8 \leq A_2 \leq \frac{16}{P} \times 4.8,$$

wherein P denotes a number of poles of the rotor.

9. The motor of claim 7, wherein a width $W_2$ of each of the at least a second notch in the circumferential direction of the rotor is determined as follows:

$$\frac{16}{P} \times \frac{R}{100} \times 1.0 \leq W_2 \leq \frac{16}{P} \times \frac{R}{100} \times 5.0,$$

wherein P denotes a number of poles of the rotor and R denotes a radius of the rotor.

10. The motor of claim 1, wherein each of the at least a second notch has a depth $D_2$ in a radius direction thereof, wherein the depth $D_2$ is determined as follows:

$$\frac{R_2}{100} \times 0.2 \leq D_2 \leq \frac{R_2}{100} \times 0.5,$$

wherein $R_2$ denotes a radius of the rotor.

11. The motor of claim 1, wherein a cross section perpendicular to a height direction of each of the at least a second notch is a rectangular shape or a trapezoid having a width which is widened toward a circumferential direction thereof.

* * * * *